UNITED STATES PATENT OFFICE.

JACOB OHLWEILER, OF MILWAUKEE, WISCONSIN, ASSIGNOR OF ONE-HALF TO EDWARD STRUPPE, OF SAME PLACE.

WEIGHING APPARATUS FOR BEER.

SPECIFICATION forming part of Letters Patent No. 341,270, dated May 4, 1886.

Application filed January 18, 1886. Serial No. 188,853. (No model.)

*To all whom it may concern:*

Be it known that I, JACOB OHLWEILER, of Milwaukee, in the county of Milwaukee, and in the State of Wisconsin, have invented certain new and useful Improvements in Weighing Apparatus for Beer, &c.; and I do hereby declare that the following is a full, clear, and exact description thereof.

My invention relates to apparatus for weighing beer or other fluids, and has for its object to provide a simple, easily-constructed device of the character named that will be applicable to liquid-fountains having a series of faucets; and my invention consists in certain peculiarities of construction, as will be hereinafter described with reference to the accompanying drawings, in which—

Figure 1:
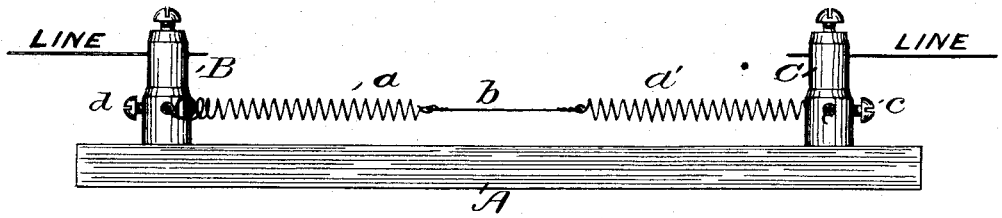
Figure 3:
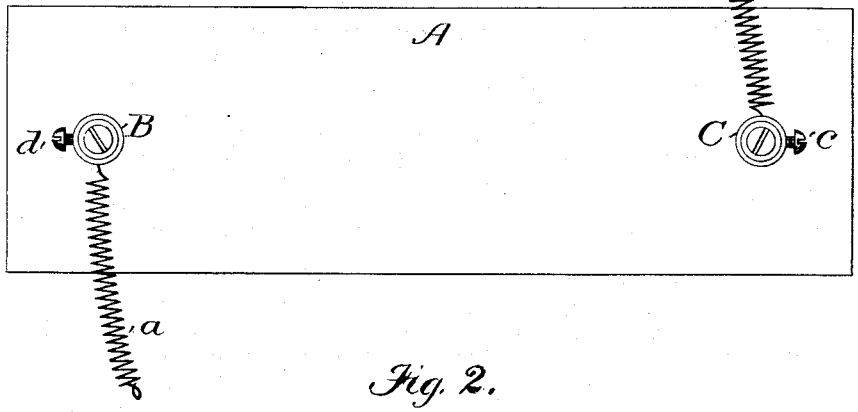
Figure 2:
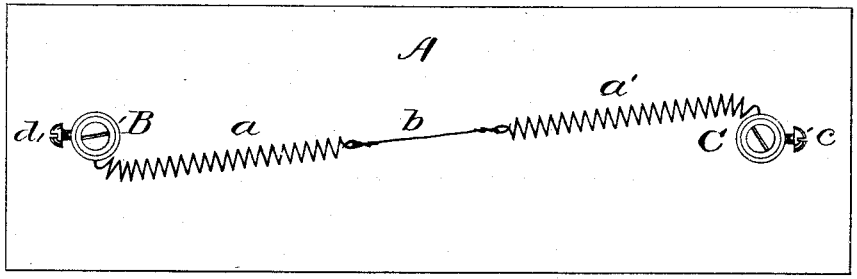

Figure 1 represents a front elevation of a liquid-fountain with my device applied thereto; Fig. 2, an end elevation partly in section, and Fig. 3 a detail sectional view of the coupling means.

A represents a liquid fountain provided with a series of faucets, $a\ b$, said faucets being designed to connect with suitable receptacles or pipes leading to such receptacles for containing liquids of different kinds or qualities. To the end faucets, $b\ b$, I connect brackets B, curved or otherwise suitably formed, and to the upper outer ends of these brackets I secure a horizontal rod, C. Though the brackets B may be connected to the faucets $b\ b$ in any suitable manner, I prefer to form the lower ends of each bracket with a semicircular bearing, $c$, designed to fit around the upper portion of a faucet and having perforated flanges $d$, and to this bearing I secure by bolts $e$ a similar bearing, $f$, having perforated flanges $g$ and adapted to fit around the lower portion of said faucet. If found desirable, I may surround the faucet with a suitable packing, $h$, interposed between said faucet and the parts $c\ f$, this packing serving to prevent abrasion, and washers $i$ may be interposed between the flanges $d\ g$. The horizontal rod C may be secured to the brackets B B in such a manner as to have at its ends ornamental nuts $k\ k$, thereby adding to the appearance of the device when in operative position.

D is a spring-balance, having its rear side provided with a groove or socket designed to engage and be adjustable on the vertical portion of a right-angular arm, E, said arm having a set-screw, $m$, by which the balance is retained in its adjusted position. The horizontal portion of the arm E is provided with a sleeve, $n$, designed to fit upon the rod C, so that the spring-balance may be moved to or fro, as occasion may require. The hook $o$ of the spring-balance D has suspended therefrom a bail, F, having bifurcated ends $p$, to which is secured a tray, G, designed to receive a pitcher or other fluid-receptacle.

Instead of securing the brackets B B to the end faucets, $b\ b$, it is obvious that the liquid-fountain may be provided with arms especially designed to receive said brackets; or the latter may be directly or otherwise suitably connected to the fountain, as may be found desirable or convenient.

When not desired for use, the bail F, carrying the tray G, may be removed from the hook $o$ of the part D so as to be out of the way, and said part D may be also removed from the right-angular arm E should occasion require.

By the construction above described I provide a simple and convenient fluid-weighing apparatus capable of being used in connection with a fountain having a series of faucets, so that any of the various kinds or qualities of liquids drawn therefrom may be readily weighed, it only requiring that the spring-balance D be moved along the horizontal rod C, so as to bring the tray G and the receptacle thereon immediately under the faucet connected with the receptacle containing the particular liquid desired.

Having now fully described my invention, what I claim as new, and desire to secure by Letters Patent, is—

1. The combination of a horizontal rod supported by brackets designed to be secured to a fluid-fountain, a right-angular arm laterally adjustable on the horizontal rod, and a spring-balance having a suspended tray and vertically adjustable on said arm, as set forth.

2. The combination of a horizontal rod supported by brackets designed to be secured to a liquid-fountain, a right-angular arm having its horizontal portion provided with a sleeve (No Model.)

E. B. TEMPLE.
SAFETY DEVICE FOR ELECTRIC WIRES.

No. 341,289. Patented May 4, 1886.

Witnesses.
Fred of F. Schwarz.
Geo. Willis Pierce

Inventor.
E. B. Temple,
By his Attorney,
Thos. D. Lockwood